US009219576B2

United States Patent
Zhang et al.

(10) Patent No.: US 9,219,576 B2
(45) Date of Patent: Dec. 22, 2015

(54) SHORT PACKET FOR USE IN BEAMFORMING

(75) Inventors: Hongyuan Zhang, Fremont, CA (US); Yong Liu, Campbell, CA (US); Hui-Ling Lou, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 1354 days.

(21) Appl. No.: 12/876,758

(22) Filed: Sep. 7, 2010

(65) Prior Publication Data

US 2011/0069688 A1   Mar. 24, 2011

Related U.S. Application Data

(60) Provisional application No. 61/243,848, filed on Sep. 18, 2009.

(51) Int. Cl.
*H04L 1/00* (2006.01)
*H04L 25/03* (2006.01)
*H04B 7/02* (2006.01)
*H04J 11/00* (2006.01)
*H04W 16/28* (2009.01)
*H04B 7/06* (2006.01)

(52) U.S. Cl.
CPC ........ *H04L 1/0083* (2013.01); *H04L 25/03343* (2013.01); *H04B 7/022* (2013.01); *H04B 7/0617* (2013.01); *H04B 7/0619* (2013.01); *H04J 11/0053* (2013.01); *H04L 2025/03426* (2013.01); *H04L 2025/03783* (2013.01); *H04L 2025/03815* (2013.01); *H04W 16/28* (2013.01)

(58) Field of Classification Search
None
See application file for complete search history.

(56) References Cited

U.S. PATENT DOCUMENTS

| 8,363,629 | B1 * | 1/2013 | Gurbuz et al. | 370/338 |
|---|---|---|---|---|
| 2004/0246983 | A1 * | 12/2004 | Kaatz | 370/432 |
| 2006/0078001 | A1 * | 4/2006 | Chandra et al. | 370/473 |
| 2007/0218889 | A1 * | 9/2007 | Zhang et al. | 455/422.1 |
| 2007/0232299 | A1 * | 10/2007 | Alcorn | 455/431 |
| 2008/0037540 | A1 * | 2/2008 | Ngo et al. | 370/392 |
| 2008/0130538 | A1 * | 6/2008 | Raissinia et al. | 370/310 |
| 2008/0151835 | A1 * | 6/2008 | Kneckt et al. | 370/331 |
| 2009/0086638 | A1 * | 4/2009 | Niu et al. | 370/238 |
| 2009/0103485 | A1 * | 4/2009 | Singh et al. | 370/329 |

(Continued)

FOREIGN PATENT DOCUMENTS

WO   WO-2007/143472   12/2007
WO   WO-2009-059229   5/2009

OTHER PUBLICATIONS

International Search Report in corresponding PCT/US2010/047990 mailed May 17, 2011.

(Continued)

*Primary Examiner* — Faruk Hamza
*Assistant Examiner* — Andrew Oh

(57) ABSTRACT

A method for generating a beamforming training (BFT) unit includes generating a physical layer (PHY) preamble of the BFT unit and generating a first encoding block and a second encoding block using PHY data and MAC data, including at least one of i) using a number of padding bits in a PHY layer of the BFT unit such that the BFT unit consists of the PHY preamble, the first encoding block, and the second encoding block, and ii) generating a MAC protocol data unit (MPDU) having a length such that the BFT unit consists of the PHY preamble, the first encoding block, and the second encoding block.

23 Claims, 9 Drawing Sheets

(56) References Cited

U.S. PATENT DOCUMENTS

| | | | |
|---|---|---|---|
| 2009/0122987 A1* | 5/2009 | Mo et al. | 380/277 |
| 2009/0196163 A1 | 8/2009 | Du | |
| 2009/0207765 A1* | 8/2009 | Yamaura | 370/310 |
| 2009/0233549 A1* | 9/2009 | Maltsev et al. | 455/41.2 |
| 2009/0310533 A1* | 12/2009 | Zheng et al. | 370/328 |
| 2009/0310537 A1* | 12/2009 | Bucknell et al. | 370/328 |
| 2009/0318091 A1* | 12/2009 | Wang et al. | 455/67.14 |
| 2010/0002677 A1* | 1/2010 | Lin et al. | 370/345 |
| 2010/0046656 A1 | 2/2010 | van Nee et al. | |
| 2010/0054223 A1* | 3/2010 | Zhang et al. | 370/338 |
| 2010/0061400 A1* | 3/2010 | Hong et al. | 370/466 |
| 2010/0074243 A1* | 3/2010 | Yonge et al. | 370/343 |
| 2010/0091673 A1 | 4/2010 | Sawai et al. | |
| 2010/0091675 A1 | 4/2010 | Sawai | |
| 2010/0146160 A1* | 6/2010 | Piekarski | 710/28 |
| 2010/0214169 A1* | 8/2010 | Kafle | 342/368 |
| 2010/0227622 A1* | 9/2010 | Mody et al. | 455/452.1 |
| 2010/0246513 A1* | 9/2010 | Lindskog et al. | 370/329 |
| 2010/0260159 A1 | 10/2010 | Zhang et al. | |
| 2010/0309834 A1 | 12/2010 | Fischer et al. | |
| 2011/0026639 A1* | 2/2011 | Rouquette-Leveil et al. | 375/298 |
| 2011/0032875 A1 | 2/2011 | Erceg et al. | |
| 2011/0064033 A1* | 3/2011 | Gong et al. | 370/329 |

OTHER PUBLICATIONS

Written Opinion in corresponding PCT/US2010/047990 mailed May 17, 2011.
IEEE Std 802.15.3c-2009 (Amendment to IEEE Std 802.15.3-2003) "IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.*, pp. 65, 86, 88, 90, 92 (2009).
IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.
"IEEE 802.15.3™ Guide Addresses Untapped High-Rate Wireless Personal Area Network (WPAN) Market," *The Institute of Electrical and Electronics Engineers, Inc.*, available at http://standards.ieee.org/announcements/pr_802153wpanguide.html (2004).
IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2008).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, (1999).
International Preliminary Report on Patentability in corresponding PCT/US2010/047990 mailed Mar. 20, 2012.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.
S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.
"IEEE P802.11 n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, (1999) Reaffirmed Jun. 12, 2003.
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHz Band," *The Institute of Electrical and Electronics Engineers, Inc.*, 1999.
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.
IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," 2006.
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications,*The Institute of Electrical and Electronics Engineers, Inc.*, (Jun. 12, 2007).
Chen, "Home Network Basis: Transmission Environments and Wired/Wireless Protocols," Prentice Hall (Jul. 2003).
Hiertz, et al., "The IEEE 802.11 Universe," IEEE Communications Magazine, pp. 62-70, Jan. 2010.

(56) References Cited

OTHER PUBLICATIONS van Nee, et al. "The 802.11 n MIMO-OFDM Standard for Wireless LAN and Beyond," Wireless Personal Communications, vol. 37, pp. 445-453 (Jun. 2006).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Shi et al., "Phase Tracking During VHT-LTF," Doc. No. IEEE 802.11-10/0771r0, *The Institute of Electrical and Electronics Engineers, Inc.*, Jul. 2010.

van Zelst et al., "Pilot Sequence for VHT-DATA," Doc. No. IEEE 802.11-10/0811r1, *The Institute of Electrical and Electronics Engineers, Inc.*, Jul. 2010.

Zhang et al., "11 ac Explicit Sounding and Feedback", *The Institute of Electrical and Electronics Engineers*, doc. No. IEEE 802.11-10/1105r0, (Sep. 2010).

Love et al., "An Overview of Limited Feedback in Wireless Communication Systems," IEEE J. on Selected Areas in Communications, vo. 26, No. 8, Oct. 2008.

Ansari, et al., "Unified MIMO Pre-Coding Based on Givens Rotation," *The Institute of Electrical and Electronics Engineers*, doc. No. IEEE C802.16e-04/516r2, pp. 1-13, Jan. 11, 2005.

Harada, "Project: IEEE P802.15 Working Group for Wireless Personal Area Network (WPANs)," IEEE 802.15-07-0693-003c (May 2007).

Draft P802.15.3/D0.2 "Information technology—Telecommunications and information exchange between systems—Local and metropolitan area networks—Specific requirements—Part 15.3: High Rate Wireless Personal Area Networks Medium Access Control (MAC) and Physical Layer (PHY) Specifications for High Rate Wireless Personal Area Networks (WPANs)," *The Institute of Electrical and Electronics Engineers, Inc.* (2001).

IEEE Std 802.15.3TM "IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs)," *The Institute of Electrical and Electronics Engineers, Inc.* (Sep. 29, 2003).

Abstract of M.P. Wylie-Green et al., "Multi-band OFDM UWB solution for IEEE 802.15.3a WPANs," 2005 IEEE/Sarnoff Symposium on Advances in Wired and Wireless Communication, pp. 102-105 (Apr. 2005).

Pyo et al., "Throughput Analysis and Improvement of Hybrid Multiple Access in IEEE 802.13.3c mm-wave WPAN," IEEE Journal on selected Areas in Communications, IEEE Service Center, Piscataway, NJ US 27(8), 1414-1424, Oct. 1, 2009.

\* cited by examiner

| 81 | 82 | 83 | 84 | 85 | 86 | 87 | 88 | 89 | 90 | 91 | 92 |
|---|---|---|---|---|---|---|---|---|---|---|---|
| ELEMENT ID | LENGTH | DIRECTION | CDOWN | SECTOR ID | FWD SECTOR SELECT | SLIMIT | L-TX | F-BACK REQ | L-RX | SNR REPORT | RSRVD |
| 8 | 8 | 1 | 6 | 6 | 6 | 6 | 5 | 8 | 5 | 8 | 5 |

BITS

FIG. 3C (Prior Art)

| 101 | 102 | 103 | 104 | 105 | 106 | 107 | 108 | 109 | 110 | 111 |
|---|---|---|---|---|---|---|---|---|---|---|
| PROTOCOL VERSION | TYPE | SUBTYPE | TO DS | FROM DS | MORE FRAG | RETRY | PWR MGMNT | MORE DATA | WEP | ORDER |
| 2 | 2 | 4 | 1 | 1 | 1 | 1 | 1 | 1 | 1 | 1 |

BITS

FIG. 3D (Prior Art)

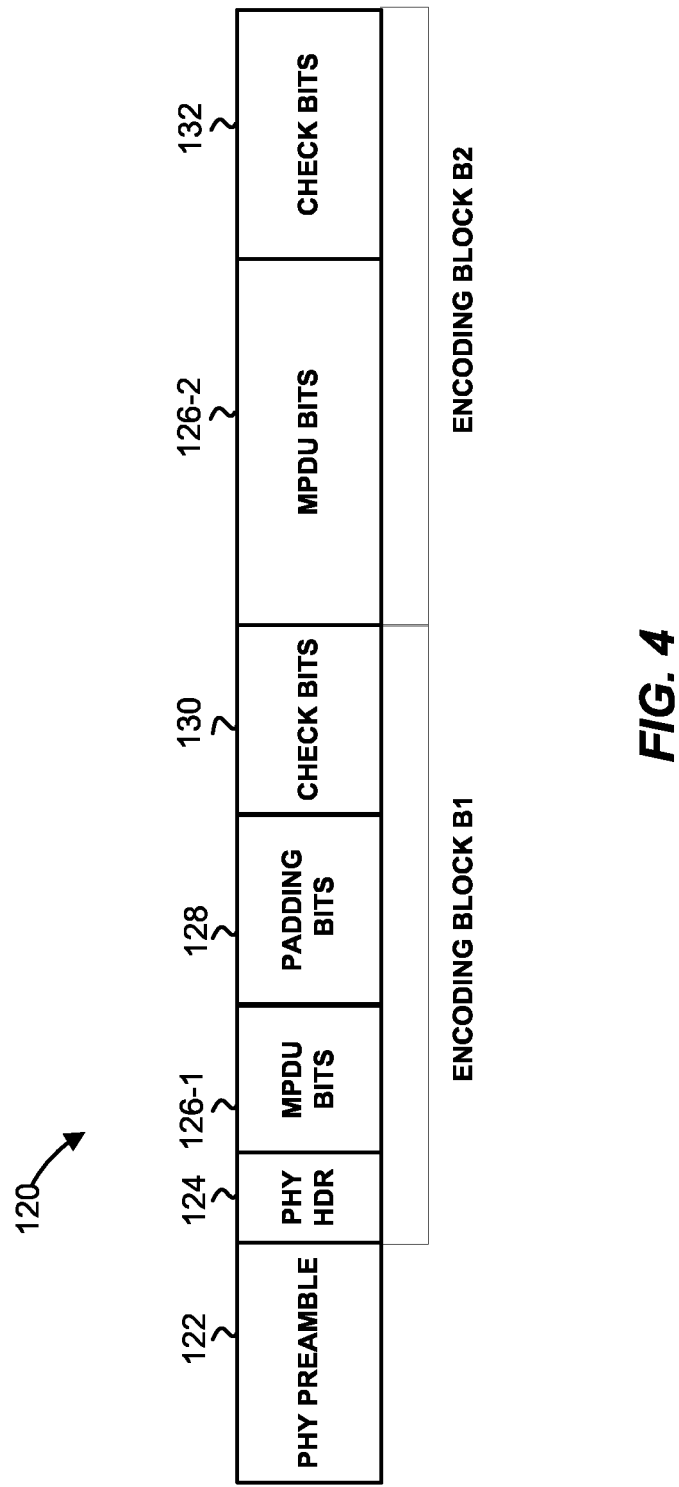

140 ⟶

| | FRAME CONTROL | RA | TA | TxSS IE | FCS |
|---|---|---|---|---|---|
| OCTETS | 2 | 6 | 6 | 9 | 4 |

| | FRAME CONTROL | DURATION | RA | TA | TxSS IE | FCS |
|---|---|---|---|---|---|---|
| OCTETS | 2 | 2 | <6 | <6 | 9 | 4 |

| | FRAME CONTROL | DURATION | BSSID | SOURCE AID | DEST AID | TxSS IE | FCS |
|---|---|---|---|---|---|---|---|
| OCTETS | 2 | 2 | 6 | 1 | 1 | 9 | 4 |

| DIRECTION | CDOWN | SECTOR ID | FWD SECTOR SELECT | SLIMIT | L-TX | F-BACK REQ | L-RX | SNR REPORT | RSRVD |
|---|---|---|---|---|---|---|---|---|---|
| 1 | 6 | 6 | 6 | 6 | 5 | 8 | 5 | 8 | 5 |

BITS

| ELEMENT ID | LENGTH | DIRECTION | CDOWN | SECTOR ID | FWD SECTOR SELECT / SLIMIT (212) | L-TX | F-BACK REQ | L-RX | SNR REPORT | RSRVD |
|---|---|---|---|---|---|---|---|---|---|---|
| 8 | 8 | 1 | 6 | 6 | 6 | 5 | 8 | 5 | 8 | 5 |

BITS

| ELEMENT ID | LENGTH | DIRECTION | SECTOR ID | FWD SECTOR SELECT | SLIMIT | L-TX | F-BACK REQ | L-RX | SNR REPORT | RSRVD |
|---|---|---|---|---|---|---|---|---|---|---|
| 8 | 8 | 1 | 6 | 6 | 6 | 5 | 8 | 5 | 8 | 5 |

BITS

230 →

| 231 | 232 | 233 |
|---|---|---|
| PROTOCOL VERSION | TYPE | SUBTYPE |
| 2 | 2 | 4 |

BITS

| PROTOCOL VERSION | TYPE | SUBTYPE | SECTOR SWEEP IE DATA 242 |
|---|---|---|---|
| 2 | 2 | 4 | 8 |

FIG. 7B

SHORT PACKET FOR USE IN BEAMFORMING

CROSS REFERENCE TO RELATED APPLICATIONS

This application claims the benefit of U.S. Provisional Patent Application No. 61/243,848, entitled "Tx Sector Sweep for 60 GHz," filed Sep. 18, 2009, the entire disclosure of which is hereby expressly incorporated herein by reference.

FIELD OF TECHNOLOGY

The present disclosure relates generally to communication systems and, more particularly, to information formats for exchanging information via communication channels.

BACKGROUND

An ever-increasing number of relatively inexpensive, low power wireless data communication services, networks and devices have been made available over the past number of years, promising near wire speed transmission and reliability. Various wireless technology is described in detail in several IEEE standards documents, including for example, the IEEE Standard 802.11b (1999) and its updates and amendments, as well as the IEEE 802.15.3 Draft Standard (2003) and the IEEE 802.15.3c Draft D0.0 Standard, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, transmission systems compliant with the IEEE 802.15n standards support one or both of a Single Carrier (SC) mode of operation and an Orthogonal Frequency Division Multiplexing (OFDM) mode of operation to achieve higher data transmission rates. For example, a simple, low-power handheld device may operate only in the SC mode, a more complex device that supports a longer range of operation may operate only in the OFDM mode, and some dual-mode devices may switch between SC and OFDM modes. Additionally, devices operating in such systems may support a control mode of operation at the physical layer of the protocol stack, referred to herein as "control PHY." Generally speaking, control PHY of a transmission system corresponds to the lowest data rate supported by each of the devices operating in the transmission system. Devices may transmit and receive control PHY frames to communicate basic control information such as beacon data or beamforming data, for example.

The IEEE 802.15.3c Draft D0.0 Standard is directed to wireless wideband communication systems that operate in the 60 GHz band. In general, antennas and, accordingly, associated effective wireless channels are highly directional at frequencies near or above 60 GHz. When multiple antennas are available at a transmitter, a receiver, or both, it is therefore important to apply efficient beam patterns to the antennas to better exploit spatial selectivity of the corresponding wireless channel. Generally speaking, beamforming or beamsteering creates a spatial gain pattern having one or more high gain lobes or beams (as compared to the gain obtained by an omni-directional antenna) in one or more particular directions, with reduced the gain in other directions. If the gain pattern for multiple transmit antennas, for example, is configured to produce a high gain lobe in the direction of a receiver, better transmission reliability can be obtained over that obtained with an omni-directional transmission.

Beamforming generally involves controlling the phase and/or amplitude of a signal at each of a plurality of antennas to define a radiation or gain pattern. The set of amplitudes/phases applied to a plurality of antennas to perform beamforming is often referred to as a steering vector (or "phasor"). The IEEE 802.15.3c Draft D0.0 Standard proposes a method for selecting a steering vector. For selecting a transmit steering vector, the proposed method generally involves, for example, transmitting training signals during a training period using each of a plurality of steering vectors, determining the quality of the received training signals, and selecting a steering vector that corresponds to the "best" received training signal. Thus, generally speaking, beamforming requires an exchange of beamforming training data between communication devices. This data takes up a large portion of the available bandwidth, resulting in a lower data throughput.

SUMMARY

In an embodiment, a method for generating a beamforming training (BFT) unit includes generating a physical layer (PHY) preamble of the BFT unit and generating a first encoding block and a second encoding block using PHY data and MAC data, including at least one of i) using a number of padding bits in a PHY layer of the BFT unit such that the BFT unit consists of the PHY preamble, the first encoding block, and the second encoding block, and ii) generating a MAC protocol data unit (MPDU) having a length such that the BFT unit consists of the PHY preamble, the first encoding block, and the second encoding block.

In an embodiment, an apparatus includes a block encoder to generate encoding blocks of a predetermined length, a beamforming training (BFT) unit generator communicatively coupled to the block encoder, the BFT unit generator to generate a BFT unit that consists of i) a physical layer (PHY) preamble and ii) data encoded in two encoding blocks, where BFT unit generator is configured to perform at least one of: i) cause a PHY generator to use a number of padding bits in the BFT unit such that the data is encoded in exactly two encoding blocks; and ii) cause a Media Access Control (MAC) generator to generate a MAC protocol data unit (MPDU) having a length such that the data is encoded in exactly two encoding blocks.

In an embodiment, in a wireless communication system, a method for generating a beamforming training (BFT) unit includes encoding data as an integer number of encoding blocks, where each of the integer number of encoding blocks includes a respective portion of the data and respective check bits, and exactly one of the integer number of encoding blocks includes padding bits.

BRIEF DESCRIPTION OF THE DRAWINGS

FIG. 3C is a diagram of a prior art transmit sector sweep (Tx SS) information element (IE) used in a BFT unit;

FIG. 3D is a diagram of a prior art frame control field used in a BFT unit;

FIG. 4 is a diagram of a BFT unit efficiently formatted according to an embodiment of the present disclosure;

FIG. 5A is a diagram of an efficiently formatted MPDU of a BFT unit, according to an embodiment;

FIG. 5B is a diagram of an efficiently formatted MPDU of a BFT unit, according to another embodiment;

FIG. 5C is a diagram of an efficiently formatted MPDU of a BFT unit, according to yet another embodiment;

FIG. 6A is a diagram of an efficiently formatted sector sweep field, according to an embodiment;

FIG. 6B is a diagram of an efficiently formatted sector sweep field, according to another embodiment;

FIG. 6C is a diagram of an efficiently formatted sector sweep field, according to yet another embodiment;

FIG. 7A is diagram of an efficiently formatted frame control field, according to an embodiment;

FIG. 7B is diagram of an efficiently formatted frame control field, according to another embodiment.

DETAILED DESCRIPTION

Figure 1:
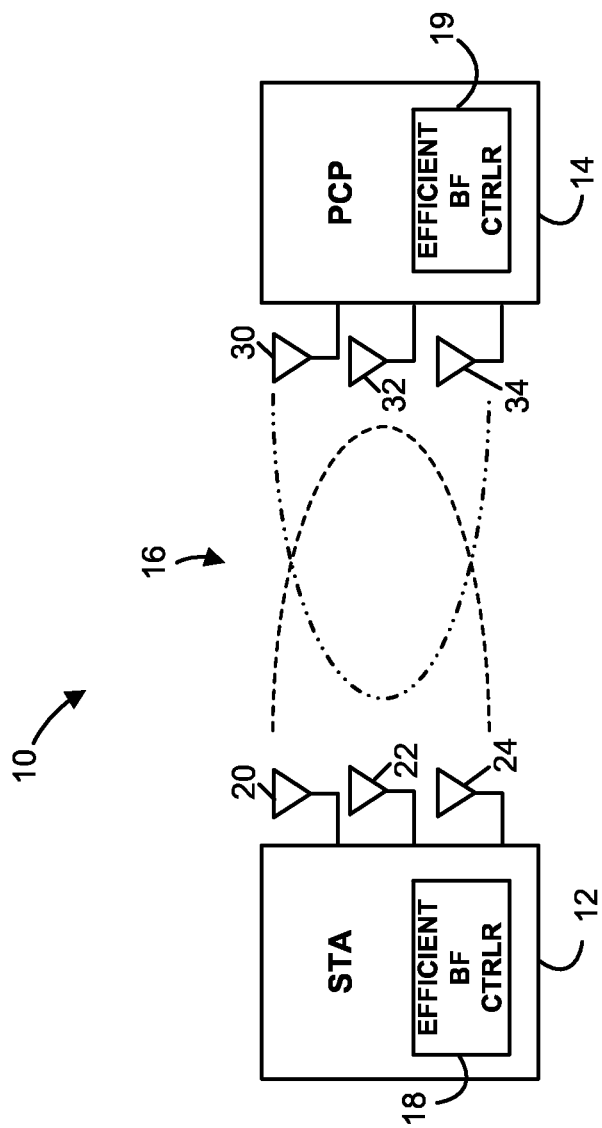
FIG. 1 is a block diagram of a communication system in which devices transmit beamforming data using the efficient formats of the present disclosure.

FIG. 1 illustrates a wireless communication system 10 in which a pair of communicating devices, such as a station 12 and a piconet central point (PCP) 14, format beamforming training (BFT) units (e.g., packets, frames) so as to reduce the overhead associated with transmitting beamforming information over a shared wireless communication channel 16. In an embodiment, the station 12 and the PCP 14 exchange BFT units that occupy only two encoding blocks. Each encoding block is generated using low-density parity check (LDPC) coding or another technique for generating an error-correcting code (ECC), according to an embodiment.

During beamforming training, devices operating in the wireless communication system 10 modulate BFT units using the lowest data rate so as to enable any device to properly receive the BFT units, according to some embodiments. For example, in an embodiment, the communication system 10 includes single carrier (SC) only, orthogonal frequency division multiplexing (OFDM) only, or dual-mode (SC and OFDM) devices, and modulation of BFT units accordingly is selected to match the slowest supported data rate (i.e., SC). To improve network efficiency, it is particularly beneficial for communicating devices to reduce the duration of BFT units and other data units (e.g., control PHY units) transmitted at the slowest data rate.

The devices 12 and 14 are equipped with respective sets of one or more antennas 20-24 and 30-34. In general, devices in the wireless communication system 10 operate in multiple modes (e.g., a transmit mode and a receive mode). Accordingly, in some embodiments, antennas 20-24 and 30-34 support both transmission and reception. However, in other embodiments, a given device includes separate transmit antennas and separate receive antennas. Further, although the example wireless communication system 10 illustrated in FIG. 1 includes two devices, 12 and 14, each with three antennas, the wireless communication system 10 in general can include any number of devices, each equipped with the same or a different number of antennas (e.g., 1, 2, 3, 4 antennas and so on). For beamforming, however, at least one of the devices 12, 14 generally should include more than one antenna.

In an embodiment, each of the devices 12 and 14 includes an efficient beamforming (BF) controller 18 and 19, respectively, configured to generate and/or process BFT units that conform to at least one of the formats discussed herein. In some embodiments, the BF controllers 18 and 19 support a multi-stage transmit (Tx) beamforming procedure that includes a "coarse" sector sweeping stage to identify a (typically wide) sector in which a signal from the transmitting device (e.g., the station 12) generates the highest power, and a beam "refinement" stage during which the identified sector is partitioned into multiple smaller sub-sectors to identify a more specific direction in which the antenna array of the transmitting device should be steered to maximize receive power, reduce interference, or otherwise improve reception. The BF controllers 18 and 19 similarly support receive (Rx) multi-stage receive beamforming to determine a direction in which the antenna array of the receiving device should be steered to maximize receive power, according to an embodiment. In an embodiment, the devices 12 and 14 can further refine sector sweeping or beam refinement during as many stages as desired. On the other hand, in some embodiments of the wireless communication system 10, the devices 12 and 14 implement only one stage of beamforming (e.g., sector sweeping).

To ensure that a receiver of a BFT unit can properly detect and correct at least some of the errors introduced into the BFT unit during transmission over the wireless communication channel 16, the devices 12 and 14 utilize error correction techniques such as LDPC encoding. In general, encoding generates a set of check (or "parity") bits based on a set of message (or "data") bits, so that an encoding block includes both the data bits and the check bits. Upon receiving the encoding block, the receiving device uses the check bits to ensure the integrity of the message bits and correct the message bits, if necessary. To efficiently use the available bandwidth, the BF controllers 18 and 19 generate BFT units that include a small number of encoding blocks. In an embodiment, the BF controllers 18 and 19 generate BFT units that consist of only a preamble and two encoding blocks.

Figure 2:
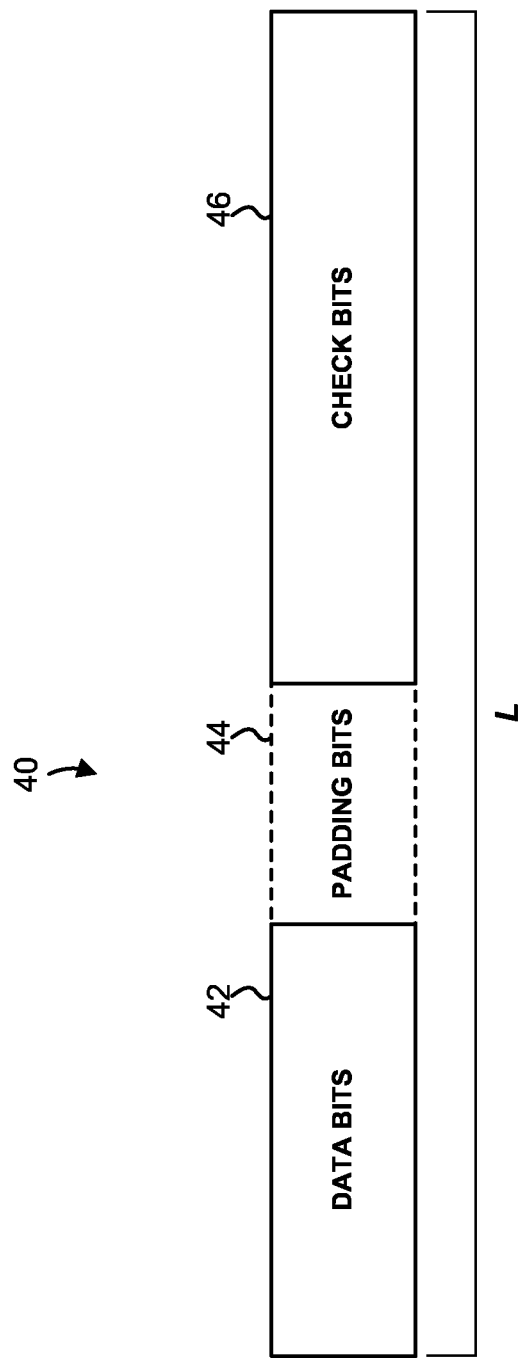
FIG. 2 is a diagram of an encoding block used in transmitting data units in the communication system of FIG. 1, according to an embodiment.

In an embodiment, beamforming data in a BFT unit is encoded as an encoding block 40 illustrated in FIG. 2. The encoding block 40 of length L, measured in bits, includes N data bits that carry non-redundant information (such PHY header data, MAC header data, MAC payload data, etc.) in a portion 42, P padding (or "stuff") bits in a portion 44, and S check bits in a portion 46. When LDPC or a similar encoding technique is used, each encoding block included in a BFT unit is of the same fixed length L and includes the same fixed number of check bits S. Thus, one or several padding bits are used to bring the number of bits to be encoded to N−S, when necessary. In other situations, the encoding block 40 does not include padding bits (i.e., P=0).

In an embodiment, each of the padding bits is set to zero. In another embodiment, each of the padding bits is set to one. Further, depending on the embodiment, the padding bits are inserted before the portion 42 or after the portion 42.

The coding rate R of the encoding block 40 is defined as the ratio of the number of non-check bits to the total number of bits in the encoding block 40. Thus, $$R = \frac{N+P}{L} \quad \text{(Eq. 1)}$$

Further, the effective coding rate can be defined as the ratio of the number of data bits to the sum of data bits and check bits in the encoding block 40

$$R = \frac{N}{N+S} \quad \text{(Eq. 2)}$$

In general, higher code rates are associated with lower reliability of transmission. In other words, the more check bits are included in an encoding block of fixed length L, the easier it is for the receiving device to detect and correct errors in the data bits. Further, for a certain code rate, higher effective code rates are associated with lower reliability of transmission. Thus, the more zero-padding bits are included in an encoding block, the more confidence the receiving device has in the N data bits extracted from the encoding block 40 of length L.

A prior art technique for formatting a BFT unit, for use as a sector sweep frame, a sector sweep feedback frame, or a sector sweep acknowledgment frame, is discussed next with reference to FIGS. 3A-D.

Figure 3A:
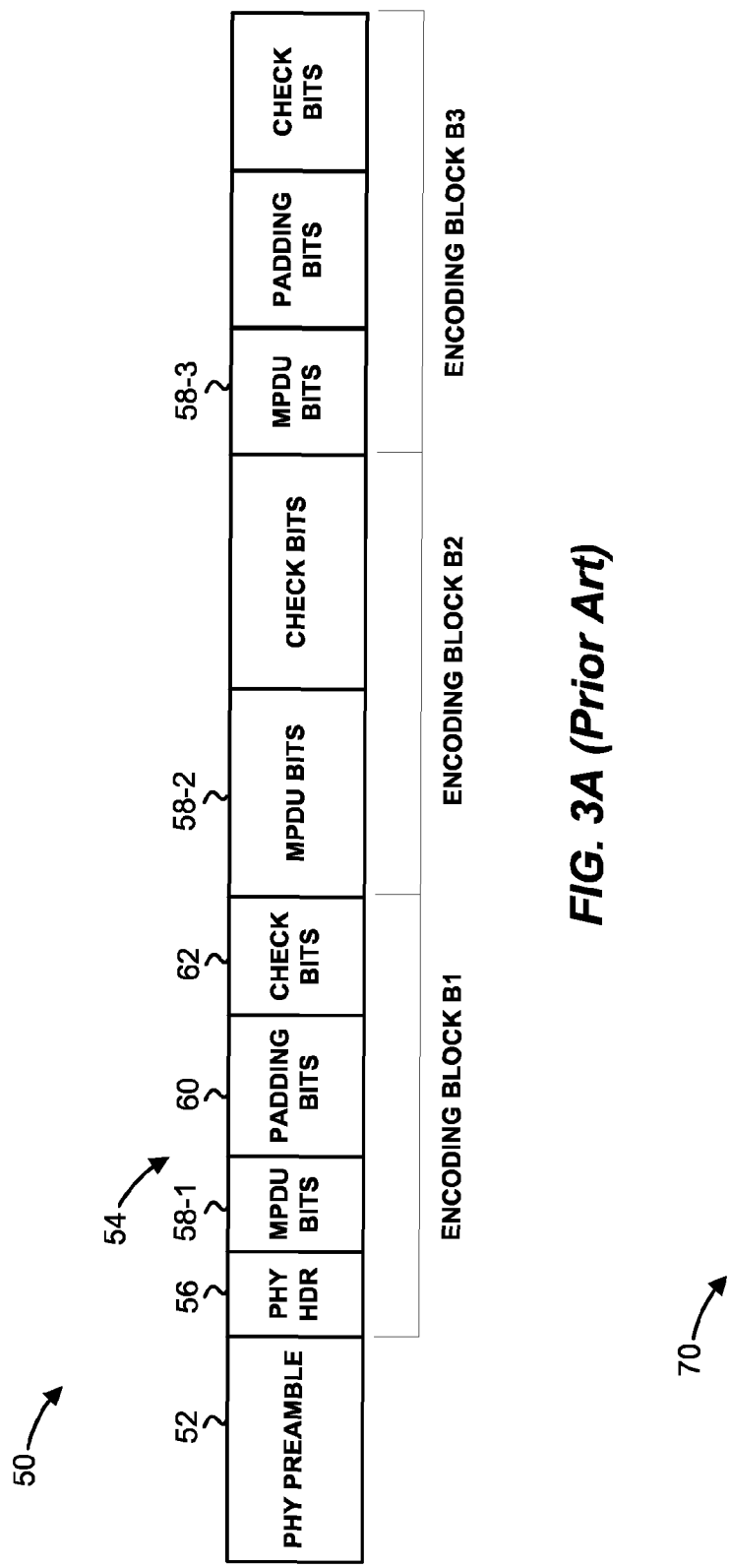
FIG. 3A is a diagram of a prior art beamforming training (BFT) unit.

FIG. 3A is a diagram of a prior art BFT unit 50 that includes a PHY preamble 52 and Physical Layer Convergence Procedure (PLCP) protocol layer data unit (PPDU) 54. As is known, the PHY preamble 52 provides training information that helps the receiver detect the PPDU 54, adjust an automatic gain control (AGC) setting, obtain frequency and timing synchronization, etc. The PPDU 54 includes a PHY header 56 that specifies basic PHY parameters required for decoding the payload of the PPDU 54 (e.g. the length of the payload, modulation/coding method, pilot insertion information, etc.) followed by a MAC protocol data unit (MPDU) 58 defining the payload of the PPDU 54.

As illustrated in FIG. 3A, the prior art BFT frame 50 includes three LDPC encoding blocks B1, B2, and B3, each of length L. In accordance with a certain known protocol specification, L=336 and R=½. The encoding block B1 includes 36 PHY header bits, first 52 bits of the MPDU 58, 80 padding bits in a padding bits portion 60, and 168 bits in a check bits portion 62. Further, the encoding block B2 includes the next 168 bits of the MPDU 58 and the corresponding 168 check bits, and the encoding block B3 includes the remaining bits of the MPDU 58, the necessary number of padding bits, and 168 check bits. It is noted that because the encoding block B1 includes only 52 bits of the MPDU 58, the remaining bits of the MPDU 58 cannot fit into the encoding block B2 to comply with the coding rate R=½, and a third encoding block is required to accommodate the remainder of the MPDU 58. Thus, the prior art BFT frame 50 includes three LDPC encoding blocks of length 336 bits, each associated with the coding rate R=½.

Figure 3B:
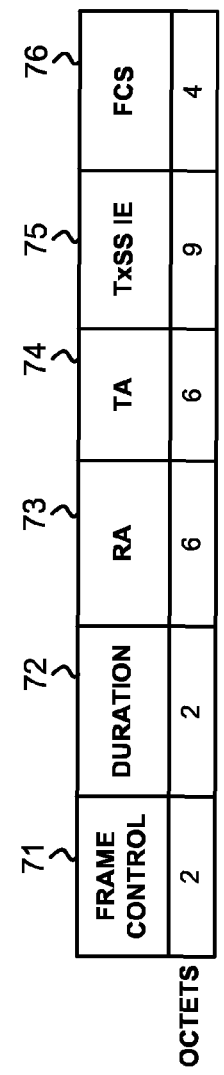
FIG. 3B is a diagram of a prior art MAC protocol data unit (MPDU) used in a BFT unit.

Referring to FIG. 3B, a prior art MPDU 70 includes a frame control field 71, a duration field 72, a receiver address field 73, a transmitter address field 74, a transmit (Tx) sector sweep (SS) information element (IE) 75, and a frame control field 76. In FIG. 3B, the length of each information element is listed in bit octets.

FIG. 3C is a diagram of a prior art Tx SS IE 80 that includes an element identifier 81, a length field 82, a direction field 83, a countdown (CDOWN) field 84 to indicate the number of BFT frames to the end of the corresponding timeslot or beamforming training session, for example, a sector id field 85, a forward sector select field 86, a sector sweep limit (SLIMIT) field 87 to indicate an upper limit to a number of Tx SS BFT units that can be transmitted, an L-TX field 88 to specify a number of the beamforming training sequences for Tx sector sweeping, a feedback request (F-BACK REQ) field 89 to request sector sweep feedback, an L-RX field 90 to specify a number of the beamforming training sequences for receive (Rx) sector sweeping, a signal-to-noise (SNR) report field 91 to provide a sector sweep metric, and a reserved field 92. In FIG. 3C, the length of each information element is listed in bits. It is noted that some of the elements in prior art Tx SS IE 80 are used to carry information in a one direction (e.g., station to PCP), while other elements are used to carry information in the opposite direction (e.g., PCP to station).

FIG. 3D is a diagram of a prior art frame control field 100, used in the prior art BFT frame such as the frame 50, that includes a protocol version field 101 to specify a protocol version, a type field 102 and a sub-type field 103 to specify whether the frame is a management frame or a control frame, for example, a "to distribution system" (ToDS) field 104 and a "from distribution system" (FromDS) field 105 to indicate a direction of the frame, a more fragments field 106 to indicate that more fragments associated with the frame are to follow, a retry field 107 to specify whether the frame corresponds to a retransmission of a previously transmitted frame, a power management field 108 to indicate a power management mode of the device transmitting the frame, a more data field 109 to indicate that more frames have been buffered for transmission, a Wired Equivalent Privacy (WEP) field 110 to indicate whether the frame body is encrypted, and an order field 111 to indicate the frame ordering technique being used. Similar to FIG. 3C, the length of each information element in FIG. 3D is listed in bits.

Several techniques for generating efficient BFT units are discussed next. In particular, a technique for generating a BFT unit in which the data portion is encoded in exactly two encoding blocks using a reduced set of padding bits is discussed with reference to FIG. 4. Several techniques for efficiently formatting the MPDU of a BFT unit so as to reduce the size of the MPDU are discussed with reference to FIGS. 5A-C. Next, a technique for efficiently formatting an SS IE for use in a BFT unit is discussed with reference to FIGS. 6A-B, and a technique for efficiently formatting a frame control field for use in a BFT unit is discussed with reference to FIGS. 7A-B.

First referring to FIG. 4, a BFT unit 120 consists of a preamble 122 and two encoding blocks, B1 and B2, of length L, generated using LDPC or a similar forward error correction (FEC) technique. In an embodiment, L=336 bits. The BFT unit 120 carries an entire prior art MPDU (e.g., the MPDU 70), according to an embodiment. In another embodiment, the BFT unit 120 carries an efficiently formatted MPDU that is shorter than a prior art MPDU.

In an embodiment, the first encoding block B1 includes 36 bits in a PHY header portion 124, a relatively large number $N_L$ of data bits in a MPDU bits portion 126-1, a relatively small number $P_S$ of padding bits in a padding bits portion 128, and S check bits in a check bit portion 130. The second encoding block B2 includes the rest of the MPDU bits in a MPDU bits portion 126-2, and S check bits in a check bit portion 132. According to this embodiment, the BFT unit 120 does not include a third encoding block. In some embodiments, $N_L$ is greater than or equal to 68 if the MPDU occupies 29 bytes, and greater than or equal to 72 if the MPDU occupies 30 bytes.

For example, to efficiently transmit a 30-byte MPDU, the parameters $N_L$=72 bits, $P_S$=60, and S=168 are used in the encoding block B1 to define the effective coding rate of (72+36)/(72+36+168)=0.39, and the parameters $N_L$=168, $P_S$=0, and S=168 are used to define the effective coding rate of ½ in the encoding block B2. In the encoding block B2, the effective coding rate is equal to the coding rate, according to this scenario. In another embodiment, to efficiently transmit a 29-byte MPDU, the parameters $N_L$=64 bits, $P_S$=68, and S=168 are used in the encoding block B1 to define the effective coding rate of (64+36)/(64+36+168)=0.373, and the parameters $N_L$=168, $P_S$=0, and S=168 are used to define the effective coding rate of ½ in the encoding block B2. Similar to the example scenario above, the effective coding rate in the encoding block B2 is the same as the coding rate. It each case, the entire MPDU is encoded in two encoding blocks.

FIG. 5A is a diagram of an MPDU 140 of a BFT unit formatted using the techniques of the present disclosure. The MPDU 140 is generally similar to the prior art MPDU 70 depicted in FIG. 3B. However, unlike the prior art MPDU 70, the MPDU 140 does not include a duration field. In this embodiment, the MPDU 70 occupies 27 bytes. Thus, if used with a BFT frame in which the first encoding block is formatted similar to the first encoding block of the prior art BFT frame 50 (see FIG. 3A), the MPDU 140 can be encoded in only two encoding blocks of length L=336. However, the MPDU 70 can also be used with the BFT frame 120 illustrated in FIG. 4, for example.

Upon receiving the MPDU 140, a receiving device determines the information typically specified in the duration field 72 of the prior art MPDU 70 using other information associated with the MPDU 140, according to an embodiment. For example, the receiving device defers channel access until the corresponding Tx SS sequence completes. The time at which the Tx sector sweep sequence completes is in turn calculated using the known duration of the Tx SS frame and the countdown value (specified in the CDOWN field of an SS IE, for example).

FIG. 5B is a diagram of an MPDU 150 of a BFT unit formatted using another technique of the present disclosure. The MPDU 150 is generally similar to the prior art MPDU 70. However, an RA field 152 and a TA field 154 in the MPDU 150 occupy less than 6 octets each. In some embodiments, each of the fields 152 and 154 stores only a subset of the corresponding 6-byte address. In an embodiment, each of the fields 152 and 154 occupies five bytes or less so that the total length of the MPDU 150 is 27 bytes or less. Thus, the MPDU 150 can be used with a BFT frame in which the first encoding block is formatted similar to the first encoding block of the prior art BFT frame 50, or with the BFT frame 120. In some embodiments, the format illustrated in FIG. 5A is used in the "middle" of a sector sweep transmit sequence, and not used in a first BFT unit transmitted during a sector sweep sequence.

FIG. 5C is a diagram of an MPDU 160 of a BFT unit formatted using another technique of the present disclosure. The MPDU 160 is generally similar to the prior art MPDU 70. However, the MPDU 160 does not include an RA field or a TA field. Rather, in an embodiment, the MPDU 160 includes a six-byte basic service set identifier (BSSID) field 162, a one-byte source association identifier 164, and a one-byte destination association identifier 166. Together, the field 162, 164, and 166 occupy four bytes less than the fields 73 and 74 of the prior art MPDU 70. Thus, the MPDU 160 can be used with a BFT frame in which the first encoding block is formatted similar to the first encoding block of the prior art BFT frame 50, or with the BFT frame 120. In an embodiment, the MPDU 160 is used during a sector sweep procedure conducted by a pair of associated stations.

FIG. 6A is a diagram of an efficiently formatted sector sweep field 200 for use in Tx sector sweep beamforming, for example. The sector sweep field 200 is generally similar to the prior art Tx SS IE 80 illustrated in FIG. 3C. However, the sector sweep field 200 does not include an IE identifier field or a length field. According to an embodiment, the sector sweep field 200 is used with a BFT unit in which the presence of sector sweep field 200 in a certain fixed position is mandatory. Further, according to this embodiment, the sector sweep field 200 always includes the same set of sub-fields. Thus, a receiving device can properly process a BFT unit that includes the sector sweep field 200, even though the sector sweep field 200 omits both the IE identifier and the length. Depending on the embodiment, the sector sweep field 200 is included in a Tx SS BFT unit, a SS feedback BFT unit, a SS acknowledgement BFT unit, etc.

Now referring to FIG. 6B, an efficiently formatted sector sweep field 210 is generally similar to the prior art Tx SS IE 80, except that a single field 212 is used to specify either the forward sector selection or the upper limit to a number of Tx SS BFT units that can be transmitted, depending on the direction in which a BFT unit that includes the sector sweep field 210 is transmitted. In particular, when transmitted in a forward direction, the sector sweep field 210 includes the information typically transmitted in the field 87 of the Tx SS IE 80 and, when transmitted in a reverse direction, the sector sweep field 210 includes the information typically transmitted in the field 86 of the Tx SS IE 80. In this manner, the size of the sector sweep field 210 is reduced by six bytes relative to the Tx SS IE 80. Thus, in some embodiments, a sector sweep field (or another field of a BFT unit) includes a field or a sub-field that specifies a first parameter type when the BFT unit is transmitted in the forward direction, and a second parameter type when the BFT unit is transmitted in the reverse direction.

Referring to FIG. 6C, an efficiently formatted sector sweep field 220 is generally similar to the prior art Tx SS IE 80, except that the sector sweep field 220 does not include a countdown (CDOWN) field. In an embodiment, the sector sweep IE 220 is used in an SS feedback BFT unit or an SS acknowledgement BFT unit because neither the SS feedback BFT unit nor the SS acknowledgement BFT unit needs the information conveyed in the CDOWN field. However, according to this embodiment, devices do not use the sector sweep IE 220 in a Tx SS BFT unit because the Tx SS BFT unit requires the information conveyed in the CDOWN field.

FIG. 7A is a diagram of a frame control field 230 for use in a BFT unit, formatted using one of the techniques of the present disclosure. The frame control field 230 consists of a protocol version sub-field 231, a type sub-field 232, and a sub-type sub-field 233. As compared to the prior art frame control field 100 (see FIG. 3D), the frame control field 230 omits several fields (e.g., ToDS, FromDS, etc.) that carry information not required in a sector sweep beamforming training procedure. Accordingly, the frame control field 230 is eight bits shorter than the frame control field 100.

In another embodiment, a frame control field 240 has the same length as the frame control field 100. However, similar to the frame control field 230 discussed above, the frame control field 240 omits several fields included in the prior art frame control field 100, and instead includes a sector sweep IE data field 242 to accommodate a portion of the Tx SS IE.

Figure 8:
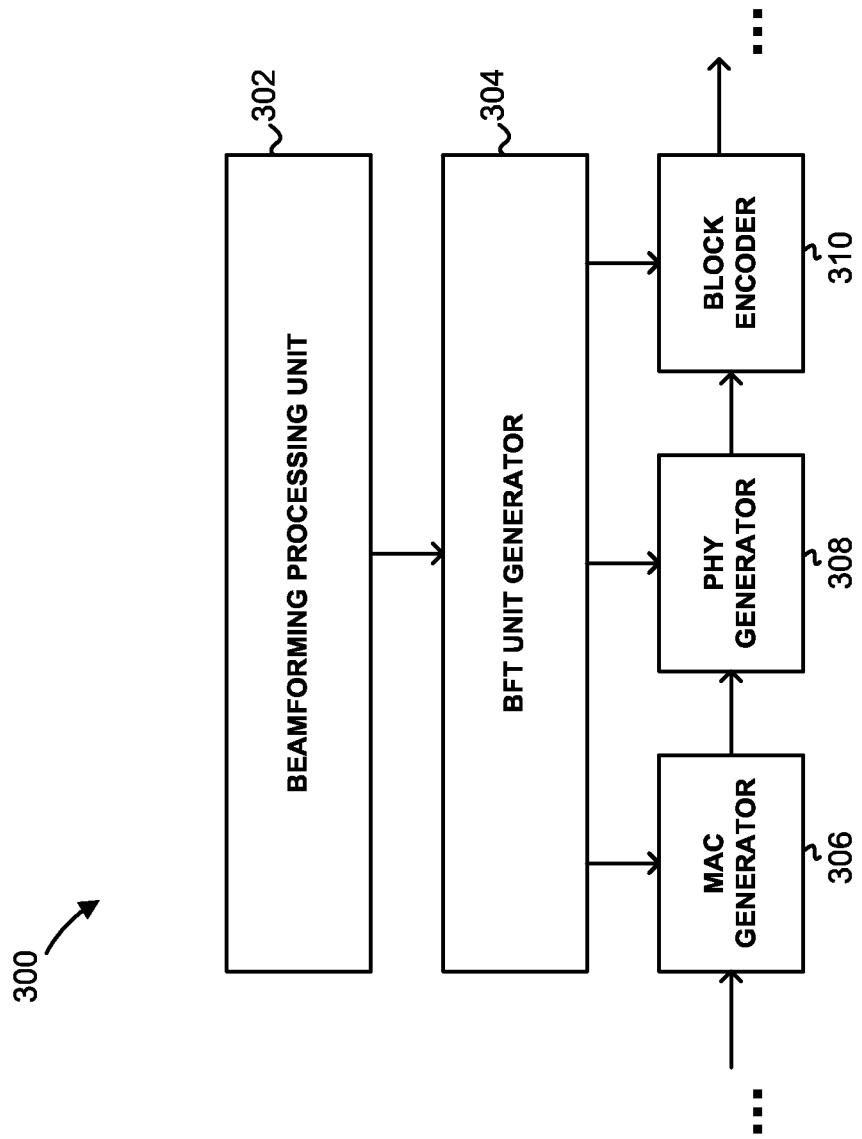
FIG. 8 is a block diagram of a beamforming controller that implements one or several formatting techniques of the present disclosure.

FIG. 8 is a block diagram of an example efficient BF controller 300 used in the station 12 and/or the PCP 14, according to an embodiment. The efficient BF controller 300 implements one or more of the techniques discussed above with reference to FIGS. 4-7B. In an embodiment, the efficient BFT controller 300 includes a beamforming processing unit 302 to implement a beamforming procedure (e.g., a Tx sector sweep beamforming training procedure, an Rx sector sweep beamforming training procedure, a Tx beam refinement procedure, an Rx beam refinement procedure), a BFT unit generator 304 to generate BFT units for one or several of the procedures supported by the beamforming processing unit 302 using beamforming data supplied by the beamforming processing unit 302, a MAC generator 306 to generate the MAC portion of a BFT unit (e.g., a MAC header), a PHY generator 308 to generate the PHY portion of the BFT unit (e.g., PHY preamble, PHY header), and a block encoder 310 to generate encoding blocks that include data bits and check bits (or, in some cases, data bits, padding bits, and check bits). In an embodiment, the encoder 310 is an LDPC encoder.

In some embodiments, the MAC generator 306 formats the MPDU portion of a BFT unit according to the format of FIG. 5A, 5B, or 5C. In some embodiments, the MAC generator 306 formats a sector sweep information element using one of the formats illustrated in FIGS. 6A-C. Further, in some embodiments, the MAC generator 306 formats a frame control field according to the format illustrated in FIG. 7A or 7B.

With continued reference to FIG. 8, in some embodiments, the PHY generator 308 and/or the encoder 310 format a BFT unit (and, in particular, the PPDU portion of the BFT unit) according to the format illustrated in FIG. 4. The BFT unit generator 304 controls the selection of the PHY format, the MAC format, or both, for a particular procedure (e.g., Tx sector sweep beamforming training, Rx sector sweep beamforming training), according to an embodiment. In some situations, the BFT unit generator 304 causes the MAC generator 306 and/or the PHY generator 308 and the encoder 310 to apply different formats to BFT units depending on whether the BFT unit is at the beginning of a training sequence or in the middle of the training sequence.

In some embodiments, two or more of the techniques discussed above are combined to further reduce the size of a BFT unit, an MPDU, or an information element included in the MPDU. Further, the techniques discussed above can be used with any block encoding technique such as LDPC, for example. Although the examples discussed above refer to encoding blocks of size 336 bits, these techniques generally can be applied to encoding blocks of other sizes.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

It will be appreciated that a method for efficiently formatting a BFT unit has been disclosed. According to the disclosed method, a BFT unit is generated that consists of a PHY preamble and an integer number of encoding blocks (e.g., LDPC blocks), so that only one encoding block includes padding bits. Each of the encoding blocks is of the same fixed length. In other words, beamforming data is distributed among the minimum number of encoding blocks. In an embodiment particularly applicable to some communication networks, the number of encoding blocks is two.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for generating a beamforming training (BFT) unit, the method comprising:
    generating a physical layer (PHY) preamble of the BFT unit; and
    generating a first encoding block and a second encoding block using PHY data and media access control layer (MAC) data, including at least one of:
        i) using a number of padding bits in a PHY layer of the BFT unit such that the PHY data and the MAC data are encoded into only the first encoding block and the second encoding block, and/or
        ii) generating a MAC protocol data unit (MPDU) having a length such that the PHY data and the MAC data are encoded into only the first encoding block and the second encoding block;
    wherein the MAC data includes a sector sweep (SS) field having a direction field, a countdown field, and a sector identifier field; and
    wherein the MAC data omits
        an information element identifier that identifies the SS field, and
        a length identifier that specifies a length of the SS field.

2. The method of claim 1, wherein generating the first encoding block and the second encoding block includes using low-density parity check (LDPC) coding.

3. The method of claim 1, wherein the BFT unit is one of a sector sweep BFT unit, a sector sweep feedback BFT unit, and a sector sweep acknowledgement BFT unit.

4. The method of claim 1, including using the number of padding bits in a PHY layer of the BFT unit such that the BFT unit consists of the PHY preamble, the first encoding block, and the second encoding block, wherein:
    generating the first encoding block includes using a PHY header and at least 64 bits of the MPDU; and generating the second encoding block includes generating 168 check bits.

5. The method of claim 4, wherein generating the second encoding block further includes using 168 data bits.

6. The method of claim 1, including generating the MPDU having the length such that the BFT unit consists of the PHY preamble, the first encoding block, and the second encoding block, wherein
the length is less than 29 bytes.

7. The method of claim 1, including generating the MPDU having the length such that the BFT unit consists of the PHY preamble, the first encoding block, and the second encoding block; the method further comprising:
generating a field to be included in the MPDU, including generating a sub-field to specify:
a first parameter type when the BFT unit is transmitted in a first direction, and
a second parameter type when the BFT unit is transmitted in a second direction.

8. The method of claim 1, wherein generating the MPDU includes not generating a duration field.

9. The method of claim 1, wherein generating the MPDU includes:
generating the receiver address field having a first length if the BFT unit is transmitted at a beginning of a beamforming training procedure; and
generating a receiver address field having a second length if the BFT unit is transmitted in a middle of the beamforming training procedure, wherein the first length is greater than the second length.

10. The method of claim 1, wherein generating the MPDU includes:
generating a first field to specify a basic service set identifier (BSSID);
generating a second field to specify a source association identifier (AID); and
generating a third field to specify a destination AID.

11. The method of claim 1, wherein the SS field is usable to support a beamforming procedure that includes a sector sweeping stage to identify a sector in which a signal from a transmitting device generates the highest power.

12. An apparatus comprising:
a block encoder to generate encoding blocks of a predetermined length;
a beamforming training (BFT) unit generator communicatively coupled to the block encoder, the BFT unit generator to generate a BFT unit that having i) a physical layer (PHY) preamble and ii) PHY data and media access control layer (MAC) data encoded in two encoding blocks, wherein the BFT unit generator is configured to perform at least one of:
cause a PHY generator to use a number of padding bits in the BFT unit such that the data is encoded in exactly two encoding blocks; and
cause a Media Access Control (MAC) generator to:
generate a MAC protocol data unit (MPDU) having a length such that the data is encoded in exactly two encoding blocks;
wherein BFT unit generator is further configured to generate a sector sweep (SS) information element (IE) to be included in the MAC data, wherein the SS IE includes a direction field, a countdown field, and a sector identifier field; and
wherein the MAC data omits i) an information element identifier that identifies the SS IE and ii) a length identifier that specifies a length of the SS IE.

13. The apparatus of claim 12, wherein the block encoder is an LDPC encoder.

14. The apparatus of claim 12, wherein the BFT unit generator causes the PHY generator to use 60 padding bits or less.

15. The apparatus of claim 12, wherein the length of the MPDU is less than 29 bytes.

16. The apparatus of claim 12, further comprising the MAC generator configured to:
generate the MPDU that does not include a duration field.

17. The apparatus of claim 12, further comprising the MAC generator configured to generate the MPDU including:
a first field to specify a basic service set identifier (BSSID);
a second field to specify a source association identifier (AID); and
a third field to specify a destination AID.

18. In a wireless communication system, a method for generating a beamforming training (BFT) unit, the method comprising:
encoding physical layer (PHY) data and media access control layer (MAC) data as an integer number of encoding blocks, wherein:
each of the integer number of encoding blocks includes a respective portion of the data and respective check bits; and
exactly one of the integer number of encoding blocks includes padding bits;
generating a sector sweep (SS) field to be included in the MAC data of the BFT unit, the MAC data including a direction field, a countdown field, and a sector identifier field, and
wherein the MAC data omits i) an information element identifier that identifies the SS field; and ii) a length identifier that specifies a length of the SS field.

19. The method of claim 18, wherein the number of encoding blocks is two.

20. The method of claim 19, wherein a first one of the two encoding blocks includes a physical layer (PHY) header, a set of padding bits, a first portion of the MPDU, and a first set of check bits, and wherein
the second encoding block includes a second portion of the MPDU and a second set of check bits.

21. The method of claim 18, wherein each of the integer number of encoding blocks is encoded using an LDPC technique.

22. The method of claim 18, wherein the data includes a PHY header and an MPDU, wherein
the length of the MPDU is less than 29 bytes.

23. The method of claim 18, wherein the SS field is usable to support a beamforming procedure that includes a sector sweeping stage to identify a sector in which a signal from a transmitting device generates the highest power.

* * * * *